No. 715,146. Patented Dec. 2, 1902.
E. RAWSON.
FRICTIONAL GEARING.
Application filed Apr. 25, 1902.
(No Model.) 2 Sheets—Sheet 2.
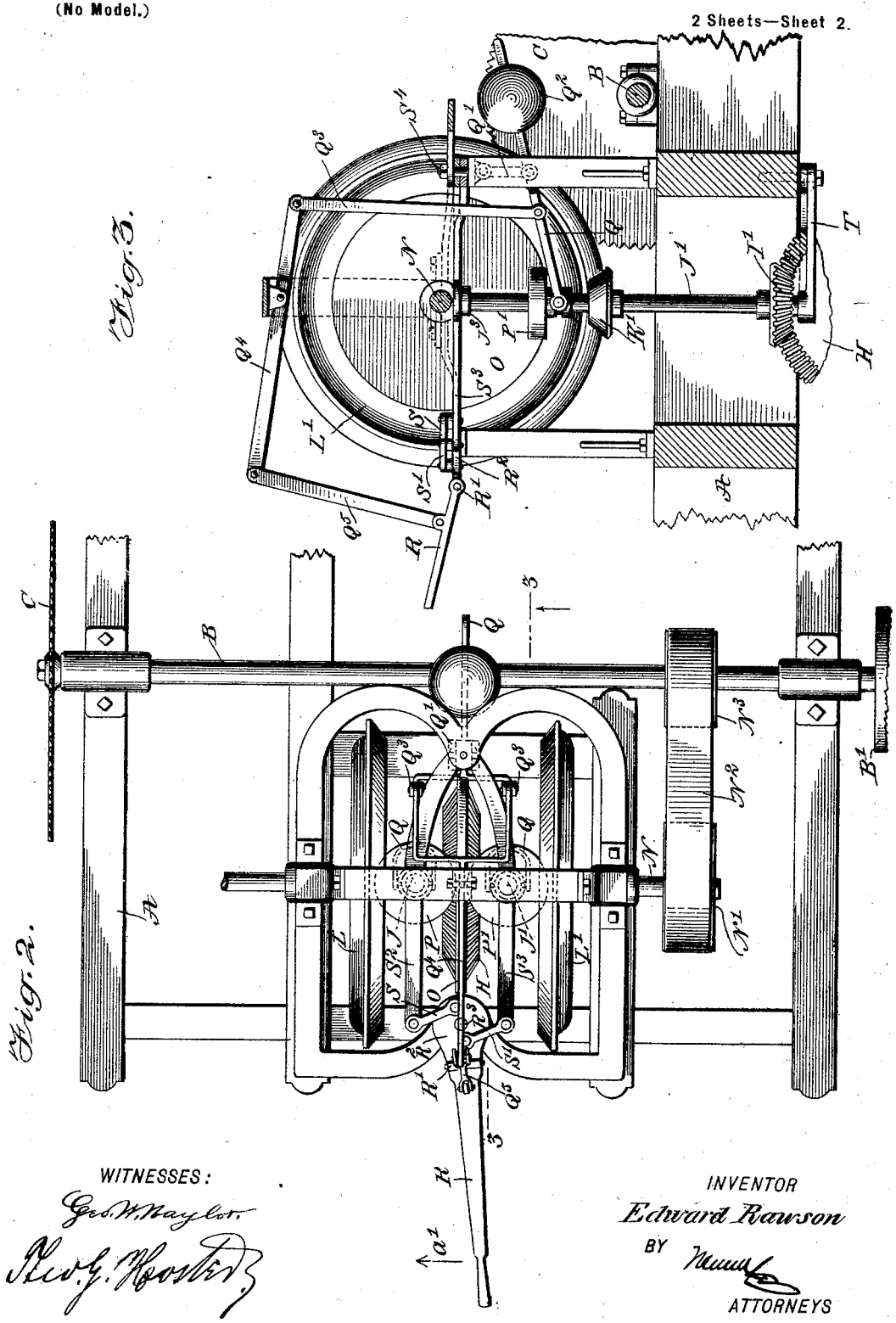
WITNESSES:
INVENTOR
Edward Rawson
BY
ATTORNEYS

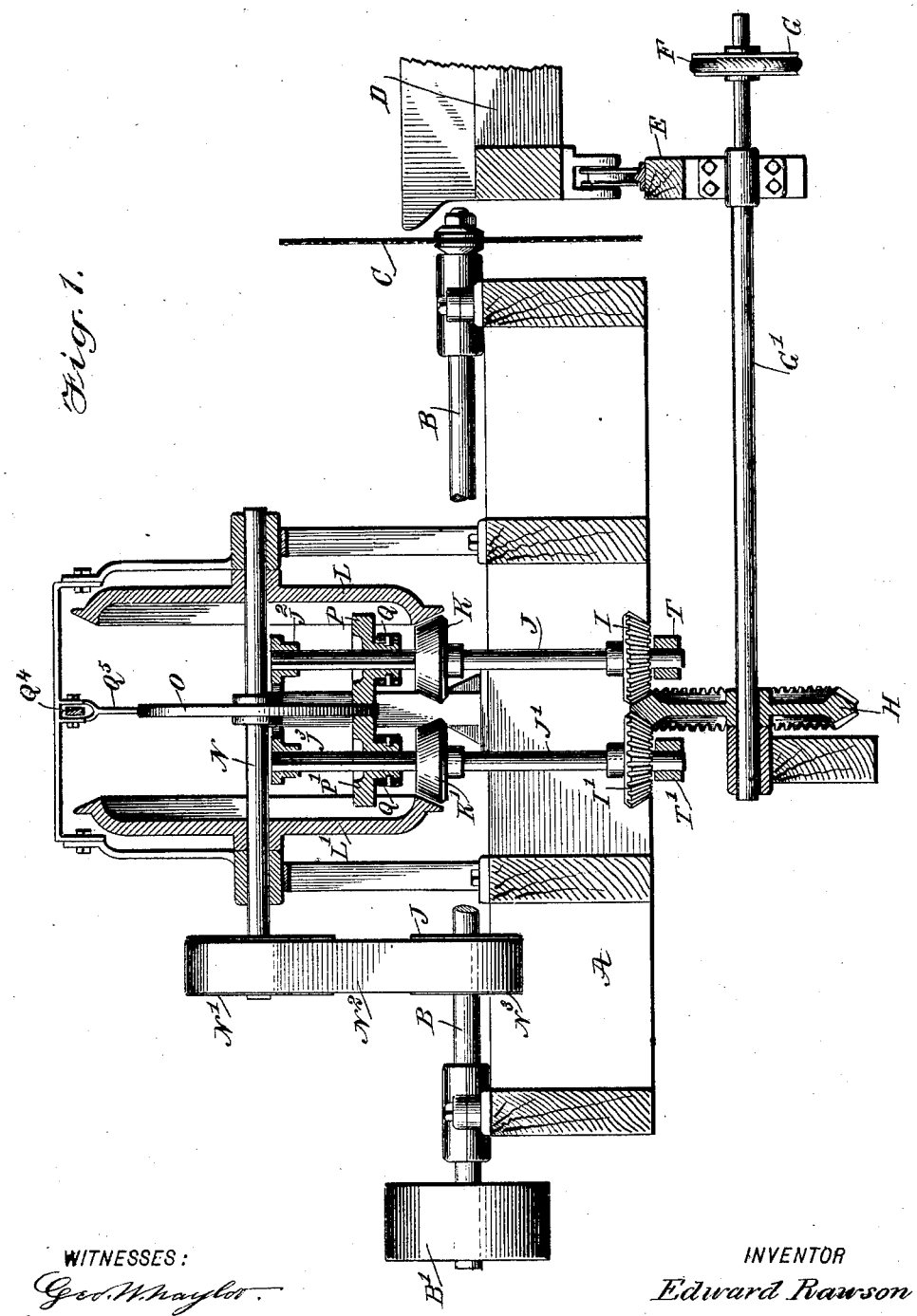

UNITED STATES PATENT OFFICE.

EDWARD RAWSON, OF MOSCOW, IDAHO.

FRICTIONAL GEARING.

SPECIFICATION forming part of Letters Patent No. 715,146, dated December 2, 1902.

Application filed April 25, 1902. Serial No. 104,648. (No model.)

*To all whom it may concern:*

Be it known that I, EDWARD RAWSON, a citizen of the United States, and a resident of Moscow, in the county of Latah and State of Idaho, have invented a new and Improved Frictional Gearing, of which the following is a full, clear, and exact description.

The object of the invention is to provide a new and improved frictional gearing designed for use on sawmills, planers, &c., which is simple and durable in construction, very effective in operation, and arranged to enable the operator to quickly and conveniently adjust the gearing to any desired speed or to reverse the same according to the nature of the work in hand.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a cross-section of the improvement as applied to a sawmill. Fig. 2 is a plan view of the same, and Fig. 3 is a sectional side elevation of the same on the line 3 3 of Fig. 2.

The improved frictional gearing is mounted on a suitably-constructed frame A, on which is journaled the arbor B, carrying at one end the circular saw C for cutting the lumber carried on the sawmill-carriage D, mounted to travel on a suitable track E and adapted to be moved forward and backward by the usual rope or cable F, winding on a drum G, secured on the shaft $G'$, as indicated in Fig. 1. On the shaft $G'$ is secured a double beveled gear-wheel H, in mesh at all times with the beveled pinions I I′, secured on the lower ends of shafts J J′, carrying beveled friction-pinions K K′, adapted to be thrown in mesh with the beveled friction-wheels L L′, secured on a shaft N, journaled in suitable bearings on the frame A. On one end of the shaft N is secured a pulley N′, over which passes a belt $N^2$, also passing over a pulley $N^3$, secured on the arbor B, provided with a pulley B′, connected by belt with other machinery for imparting a rotary motion to the arbor B and its circular saw C. The rotary motion of the arbor B is transmitted by the pulleys $N^3$ N′ and belt $N^2$ to the shaft N, so that the beveled friction-wheels L and L′ are rotated to rotate either of the beveled friction-pinions K K′ and the corresponding shaft J or J′, so that the beveled gear-wheel I or I′ thereof rotates the double beveled gear-wheel H in a forward or backward direction to give the desired forward or backward movement to the sawmill-carriage D.

On the shafts J and J′ are mounted to slide and to rotate the friction-pinions P and P′, adapted to be moved in frictional contact with opposite sides of a friction-disk O, secured on the shaft N, so as to rotate in unison with the beveled friction-wheels L and L′. The pinions P and P′ are hung in a double fork Q, fulcrumed on a link Q′, (see Fig. 3,) held on the main frame A, and the said double fork Q is counterbalanced by a weight $Q^2$ and is pivotally connected by a link $Q^3$ with a lever $Q^4$, fulcrumed on the main frame and connected by a link $Q^5$ with a handle R, connected by a hinge R′ with a lever $R^2$, fulcrumed at $R^3$ on the main frame, the pintle of the hinge R′ and the pivot $R^3$ extending at right angles, as plainly indicated in Fig. 2. The lever $R^2$ is pivotally connected at opposite sides of its fulcrum with links S S′, extending in opposite directions and connected with levers $S^2$ $S^3$, fulcrumed at $S^4$ on the main frame, the said levers carrying the upper bearings $J^2$ $J^3$ of the shafts J and J′, the lower bearings T T′ of the said shafts being in the form of links pivoted on the main frame. (See Fig. 3.)

The operation is as follows: When it is desired to move the carriage D forward, the operator swings the lever $R^2$ sidewise in the direction of the arrow a′ by manipulating the handle R correspondingly, so that the said lever pulls on both links S S′ simultaneously to swing the levers $S^2$ $S^3$ inwardly toward each other, thus moving the shafts J J′ bodily in the same direction to engage the friction-wheels P P′ with the opposite faces of the revolving disk O. The rotary motion of the disk O is now transmitted by the wheels P P′ to the shafts J J′, which in turn rotate the double gear-wheel H by the beveled pinions I I′. The rotary motion of the gear-wheel H is transmitted by the shaft G' to the drum G, which by the rope or cable F imparts a forward or feeding motion to the carriage D.

For different work it is desirable to vary the speed of the carriage on the forward or feeding motion, and for this purpose the operator by swinging the handle R up or down can move the wheels P P' nearer to or farther from the peripheral edge of the disk O, so that the shafts J J' are rotated at a faster or slower speed without variation in the speed of the arbor B and saw C. It is understood that when the operator swings the handle R upward the link $Q^5$, lever $Q^4$, and link $Q^3$ impart a swinging motion to the weighted double fork Q for the latter to slide the wheels P P' downward on the shafts J J'—that is, to move the wheels nearer to the peripheral edge of the disk O to increase the speed of the said shafts. When the handle R is swung downward, the reverse action takes place—that is, the wheels P P' are moved upward on the shafts and nearer to the middle of the disk O to decrease the speed of the shafts J J'.

When it is desired to impart a quick return movement to the carriage D the operator swings the lever $R^2$ in the inverse direction of the arrow $a'$ to move the shafts J J' simultaneously from each other to disengage the wheels P P' from the disk O and to move the beveled friction-pinions K K' into mesh with the large friction beveled wheels L L'. The rotary motion of the latter is transmitted by the pinions K K' to the shafts J J', which now turn in an opposite direction, and hence rotate the shaft G' to insure a quick return movement of the carriage.

It is understood that the sidewise motion of the shafts J J' required for moving the pinions K K' in and out of mesh with the wheels L L' is so slight that it does not affect the meshing of the beveled gear-wheels I I' with the double beveled gear-wheel H.

Having thus described my invention, I claim as new and desire to secure by Letters Patent—

1. A frictional gearing, comprising a driven disk, beveled friction-wheels rotating in unison with the said driven disk, shafts geared with the device to be driven, means for shifting the shafts, pinions mounted to slide on and to turn with the said shafts, and engaging the disk on opposite sides, means for shifting the said pinions and beveled friction-pinions secured on the said shafts and adapted to mesh with the said beveled friction-wheels, as set forth.

2. A frictional gearing, comprising a driven disk, beveled friction-wheels rotating in unison with the said driven disk, shafts geared with the device to be driven, pinions mounted to slide on and to turn with the said shafts, and engaging the disk on opposite sides, means for shifting the said pinions, beveled friction-pinions secured on the said shafts and adapted to mesh with the said beveled friction-wheels, and manually-controlled means for moving the said shafts bodily, as set forth.

3. A frictional gearing, comprising a driven disk, beveled friction-wheels rotating in unison with the said driven disk, shafts geared with the device to be driven, means for shifting the shafts, pinions mounted to slide on and to turn with the said shafts, and engaging the disk on opposite sides, beveled friction-pinions secured on the said shafts and adapted to mesh with the said beveled friction-wheels, and manually-controlled means for moving the said slidable pinions up and down on their shafts, as set forth.

4. A frictional gearing, comprising a driven disk, beveled friction-wheels rotating in unison with the said driven disk, shafts geared with the device to be driven, pinions mounted to slide on and to turn with the said shafts, and engaging the disk on opposite sides, beveled friction-pinions secured on the said shafts and adapted to mesh with the said beveled friction-wheels, and manually-controlled means for moving the said shafts bodily and for shifting the said slidable pinions on their shafts, as set forth.

5. A frictional gearing, comprising a driven disk, beveled friction-wheels rotating in unison with the said driven disk, shafts geared with the device to be driven, pinions mounted to slide on and to turn with the said shafts, and engaging the disk on opposite sides, beveled friction-pinions secured on the said shafts and adapted to mesh with the said beveled friction-wheels, and manually-controlled means for moving the said shafts bodily and for shifting the said slidable pinions on their shafts, the said means comprising a double fork in which the said slidable pinions are hung, levers carrying the bearings for the said shafts, a lever connected with the said bearing-levers, a handle hinged on the said lever, and a connection between the said handle and the said double fork, as set forth.

6. A frictional gearing, comprising a driven disk, a pair of beveled friction-wheels rotating in unison with the disk, a pair of shafts mounted to rotate in movable bearings, a transmission-shaft, a gearing connecting the said transmission-shaft with the said pair of shafts, a pair of pinions mounted to slide on and to rotate with the said pair of shafts and adapted to engage the said disk, a pair of beveled pinions secured on the said pair of shafts and adapted to engage the said beveled friction-wheels, and means under the control of the operator for moving the bearings of the said pair of shafts and for sliding the said pinions on the said pair of shafts, as set forth.

In testimony whereof I have signed my name to this specification in the presence of two subscribing witnesses.

EDWARD RAWSON.

Witnesses:
H. R. SMITH,
C. J. ORLAND.